3,001,403
LIQUID SAMPLER
Jennings B. Edwards, Wilmington, N.C., assignor of ninety percent to William R. Kiser, Jr., and ten percent to Jackson L. Kiser
Filed July 1, 1957, Ser. No. 669,126
7 Claims. (Cl. 73—425.6)

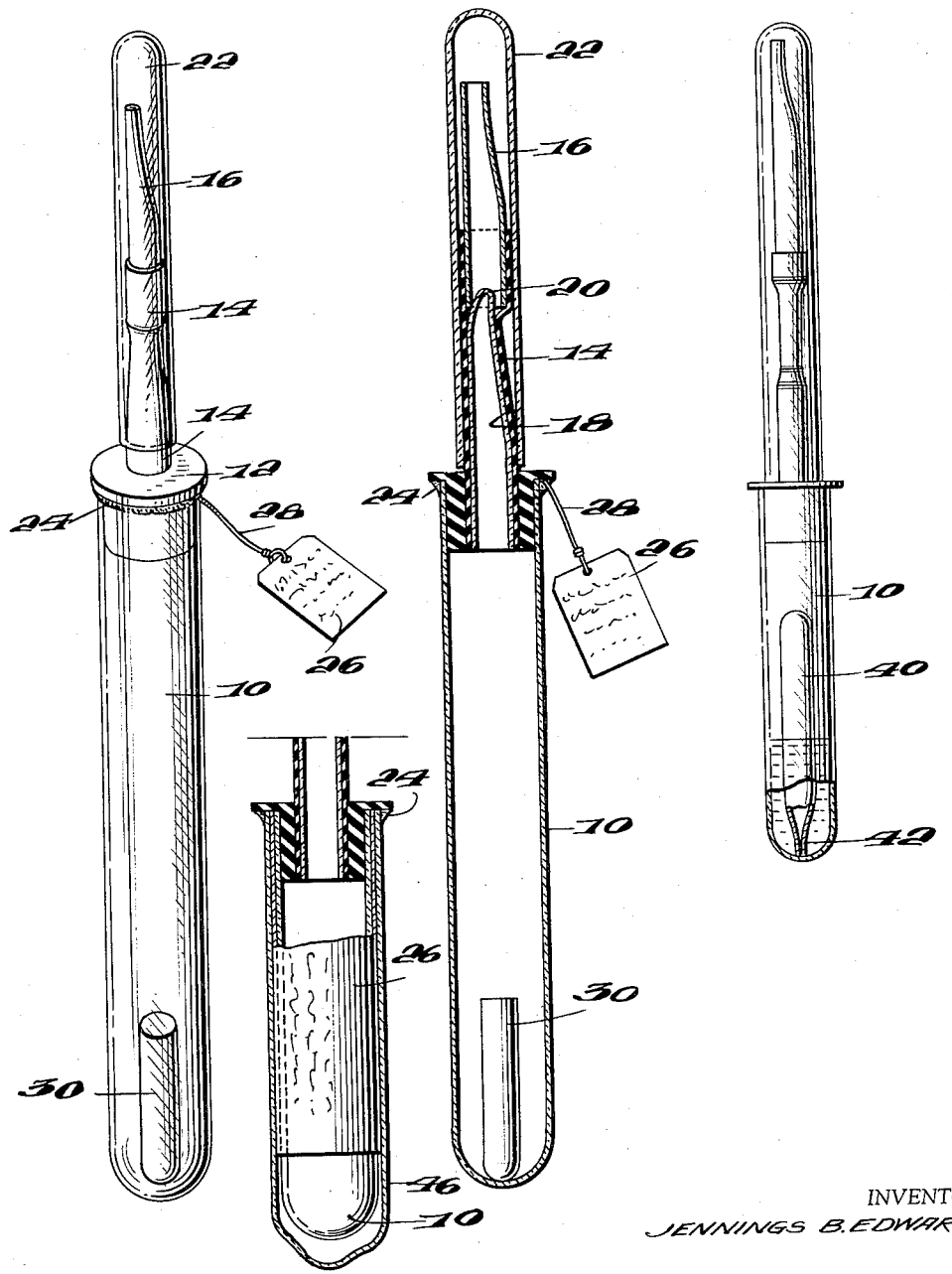

This invention relates to devices for taking samples of liquid, and more particularly to devices for taking samples of milk in large containers.

In recent years, the character of milk handling from the farmer to the producer has undergone a fairly radical change. The ten-gallon milk can in which the farmer put his milk to await a pick-up by the milk producer is becoming a relic of the past. More and more milk producers are turning to bulk milk handling methods in which the farmer put his milk in a large vat cooler and the milk is subsequently transferred from the farmer's vat into a milk tank truck.

The new method of milk handling has given rise to problems of bacteria control at the farm. In the past, because the farmer's milk was transported in milk cans distinct from those of other farmers, the quality of milk could be tested by taking samples of the milk at the laboratory and using approved laboratory technique for the testing. With the new practice, this is not possible because the milk of many farmers is mixed together in a single truck. Accordingly, samples must be taken at the farm from the farmer's cooler.

Until the development of the instant invention, no satisfactory milk sampling procedure was known.

Ultimately, the problem associated with milk sample taking is whether the tests run from the milk sample are provable in court. If the tests are subject to the attack that contamination was introduceable from factors beyond the farmer's control after the sample has been taken from the farmer's cooler, the testing procedure is worthless. The importance of this fact can be realized when it is appreciated that the public health officer must have means for preventing the sale of milk from a farmer using unsanitary practices.

The present invention provides a solution to the health officer's problem in that it permits the taking of a milk sample by an unskilled laborer while positively precluding the inadvertent contamination between the farm and the laboratory.

Essentially, the invention consists of an evacuated test tube, a hollow rod extending from a stopper in the mouth of the test tube, and a frangible member normally blocking the passage of fluid from the rod to the test tube. The rod is normally covered by a removable enclosure and all parts are sanitized prior to use. The milk tank truck driver has only to dip the end of the rod into the milk, break the frangible member, and the milk is drawn into the evacuated tube. The test tube is sealed and labeled in such a manner that the samples cannot become inadvertently mixed and tampering with the samples is readily detectable.

It is an object of the invention to provide a method and device for taking liquid samples which is not susceptible to inadvertent contamination and which is substantially tamper-proof.

It is another object of the invention to add to such a sampling device an agitator to be used to provide countercurrent agitation without removing the sample from the original container.

It is yet another object of the invention to provide a sample-taker which contains means for testing the sampled material.

These and other objects of the invention will become more readily apparent from the following detailed description of the invention taken in conjunction with the accompanying drawings in which:

FIG. 1 is a perspective view of the milk sampler;
FIG. 2 is a cross-sectional view through the center of the milk sampler;
FIG. 3 is an elevational view of a modification with a portion thereof in section; and
FIG. 4 is an elevational view partly in section showing an arrangement for attaching a label to the sample.

The sampler, in the embodiments shown in FIGS. 1 and 2 consists of a test tube 10 having a stopper 12 closing the mouth of the test tube. Extending from the stopper is a flexible tube 14 terminated in a hollow glass rod 16. Disposed within the flexible tube 14 is a glass closure 18 having a sealed tip 20 which forms an air-tight seal between the tube 14 and the interior of the test tube 10.

Covering the flexible tube 14 and the glass rod 16 is a small inverted glass cover 22. The glass cover serves the dual function of maintaining the hollow rod 16 in sanitary condition and, the rigidity of the cover 22 prevents the inadvertent breaking of the frangible closure 18.

The test tube 10 is evacuated prior to sealing the closure 20 and the parts have, of course, been completely sterilized. It can be observed that upon breaking the frangible closure 18, the fluid will be permitted to pass through the hollow rod 16 into the container 10.

In operation of the device thus far described, the cover 22 is removed and the hollow rod 16 is dipped into the fluid to be sampled. While rod 16 is in the fluid, the frangible closure 18 can be broken with the fingers of the operator and the vacuum in test tube 10 will cause the fluid to be drawn into the container 10. The cover 22 is then replaced and a sanitary sample has been taken. The only possibility for contamination would be the deliberate forcing of foreign particles into the rod 16 prior to the taking of the sample.

While the device, as described, is satisfactory for taking samples, additional features have been added which considerably increase its utility. At the joint between the stopper and test tube, a plastic seal 24 has been formed. The seal 24 permits the detection of any tampering or alteration of the sample originally taken. Coupled with the plastic seal is a tag 26 fixed by a string 28 to the plastic seal. Preferably, the tag has a place for the farmer's signature and a place for the truck driver's signature, the signatures being made on safety paper which will prevent alteration of the signature.

An additional feature is the addition of a small glass rod 30 to the main test tube container 10. It must be appreciated that the milk sample must be thoroughly agitated before testing. The rod 30 enables the milk to be agitated with the counter current principle of agitation merely by shaking up and down. Through this improvement, the tested milk samples will meet the highest standards of testing procedures.

In FIG. 3 there is shown an added feature of the sampler which considerably increases its utility.

In the industrial control of milk as it is being processed from the truck through pasteurization to bottling, one of the greatest problems confronting the dairy is the inadvertent fecal contamination which could give rise to typhoid, diphtheria, dysentery or the like. It is known that the bacteria *Escherichia coli*, coming from fecal matter, forms a gas in the presence of brilliant green bile broth at 37° C. which is approximately the temperature of the human body.

The presence of *Escherichia coli* can be detected in a very simple expeditious manner by the sampler shown in FIG. 3. In this embodiment, the tube 10 which is of approximately 5 ml. capacity contains 2 ml. of brilliant green bile broth. Additionally, it contains an inverted vial 40 which is tapered down at 42 to an opening having a diameter in the range of 1 to 4 millimeters. The vial 40 has been completely filled with brilliant green bile broth and, because of the surface tension of the broth cooperating with the small hole at 42, no air can enter the vial.

The tube 10 has been evacuated as described before so that when used in the manner described above, it will draw in a 1 ml. sample. The bacteria enters the vial 40 and in about 18 to 24 hours, a gas will begin to form which will displace the broth from the vial, indicating the presence of the undesirable bacteria.

This expeditious manner of detecting will show the presence of the undesirable bacteria in time to prevent shipment of the milk the next day.

It will be obvious that other culture media which are specific to a particular micro-organism to be detected can be used in identically the same manner.

In FIG. 4 an alternative method of affixing a safety label to the container is shown. In that embodiment, instead of a string tag, the label is wrapped around the tube 10 and the tube and label 26 are enclosed in a cellophane or other plastic envelope 46. The opening of the envelope is sealed by the plastic 24 to prevent tampering.

The envelope method of applying the tag to the container is considered to be an improvement over the arrangement of FIGS. 1 and 2 in that the tangling of string tags is completely avoided.

In summary of the invention, it will be appreciated that if the integrity of the truck driver can be relied upon, the health officer can be assured that the sample which he tests is free from contamination introduced inadvertently through sources other than the farmer. The container is completely sterilized, and the arrangement is such that there is no possibility of an unskilled truck driver clumsily contaminating the milk. The labeling with the signature of the farmer and the truck driver on the indelible tape coupled with the manner of sealing the test tube to the stopper prevents mixing of the samples and tampering after the truck driver has left the presence of the farmer.

With the controls described above, the health officer will be able to proceed against an unsanitary farmer who may be endangering the health of the community with the assurance that his sampling and testing will not be subject to indefensible attack in court.

In a general manner, while there has been disclosed in the above description, what is deemed to be the most practical and efficient embodiment of the invention, it should be well understood that the invention is not limited to such embodiment as there might be changes made in the arrangement, disposition and form of the parts without departing from the principle of the present invention as comprehended within the scope of the accompanying claims.

I claim:

1. A sampler comprising, an evacuated container, a tube extending from said container, frangible means blocking fluid flow from said tube to said container, a small vial in said container, said vial having an aperture forming a communication between the interior of said vial and the interior of said container and a culture medium specific to a preselected class of micro-organisms partially filling said container and completely filling said vial.

2. A sampler comprising, an evacuated test tube, a hollow rod extending from the mouth of said test tube, frangible means blocking fluid flow from said rod to said test tube, a small vial having a length greater than the inside diameter of said test tube and disposed in said test tube with its opening directed away from the mouth of said test tube, and a culture medium specific to a preselected class of micro-organisms partially filling said container and completely filling said vial.

3. A sampler according to claim 2 in which said medium is brilliant green bile broth.

4. A sampler comprising, an evacuated test tube, a hollow rod extending from the mouth of said test tube, frangible means blocking fluid flow from said rod to said test tube, a small vial having a length greater than the inside diameter of said test tube and disposed in said test tube, said vial having a tapered down opening directed away from the mouth of said test tube, and a culture medium specific to a preselected class of gas-forming micro-organisms partially filling said container and completely filling said vial.

5. A sampler according to claim 4 in which the vial opening has a diameter in the range of 1 to 4 mm. whereby surface tension will prevent the escape of the medium therefrom except under the pressure of gas formed by said micro-organisms.

6. The method of collecting milk samples from a milk producer's vat cooler comprising the steps of: drawing milk into a previously evacuated and sealed container, affixing identifying indicia to said container, and transporting said container away from the site of said vat cooler for testing.

7. The method of collecting milk samples from a milk producer's vat cooler comprising the steps of: drawing milk into a previously evacuated and sealed container through an elongated passage whereby the exterior of said container may remain out of contact with the milk, affixing identifying indicia to said container, and transporting said container away from the site of said vat cooler for testing.

References Cited in the file of this patent

UNITED STATES PATENTS

| | | | |
|---|---|---|---|
| 1,333,935 | O'Connor | Mar. 16, | 1920 |
| 1,433,075 | Gottlieb | Oct. 24, | 1922 |
| 1,633,618 | Thomas | June 28, | 1927 |
| 1,678,540 | Trenner | July 24, | 1928 |
| 1,871,464 | Oppenheimer | Aug. 16, | 1932 |
| 2,204,547 | Grier | June 18, | 1940 |
| 2,290,857 | Booye et al. | July 28, | 1942 |
| 2,476,093 | Hirsch | July 12, | 1949 |
| 2,641,452 | Wagner | June 9, | 1953 |
| 2,655,152 | Turner | Oct. 13, | 1953 |
| 2,895,475 | Cole | July 21, | 1959 |

FOREIGN PATENTS

| | | | |
|---|---|---|---|
| 667,257 | France | Jan. 11, | 1929 |